United States Patent [19]

Sporn

[11] Patent Number: 5,329,885
[45] Date of Patent: Jul. 19, 1994

[54] LEASH-CONTROLLABLE DOG HARNESS

[76] Inventor: Joseph S. Sporn, 274 W. 86th St. #4B, New York, N.Y. 10024

[21] Appl. No.: 23,638

[22] Filed: Feb. 26, 1993

[51] Int. Cl.$^5$ .............................................. A01K 27/00
[52] U.S. Cl. ................................... 119/864; 119/792; 119/905; 119/907
[58] Field of Search ................. 119/96, 106, 109, 850, 119/907, 856, 857, 863, 905, 792, 793, 794, 864; 182/3

[56] References Cited

U.S. PATENT DOCUMENTS

| | | | |
|---|---|---|---|
| 2,464,867 | 3/1949 | Johnson | 119/96 |
| 2,778,335 | 1/1957 | Hirsch | 119/109 |
| 2,956,541 | 10/1960 | Rall | 119/96 |
| 3,709,491 | 1/1973 | Minchin | 119/96 |
| 3,769,939 | 11/1973 | Wais et al. | 119/106 |
| 5,150,667 | 9/1992 | Salidrigas | 119/96 |

FOREIGN PATENT DOCUMENTS

| | | | |
|---|---|---|---|
| 24675 | 4/1931 | Australia | 119/96 |
| 3925548 | 3/1990 | Fed. Rep. of Germany | 119/106 |
| 1352575 | 1/1964 | France | 119/109 |
| 2594079 | 8/1987 | France | 119/96 |
| 2215973 | 10/1989 | United Kingdom | 119/106 |

Primary Examiner—John J. Wilson
Assistant Examiner—Todd E. Manahan
Attorney, Agent, or Firm—Michael Ebert

[57] ABSTRACT

A leash controllable harness adapted to inhibit a dog wearing the harness from straining against the leash held by an individual walking the dog, the harness inducing the dog to come to a halt or to walk at a pace acceptable to the leash holder. The harness is composed of a pair of loops that depend from a leash-coupling junction at which the loops are joined, the loops being angled at the junction with respect to each other so that they cross over at a crossover site below the junction. When the harness is installed on the dog, the coupling junction to which a leash is connected then overlies the dog's shoulder intermediate the right and left forelegs, and the crossover site lies under the dog's chest, one loop running from the site through the crotch between the chest and the left foreleg and back to the junction, the other loop running from this site through the crotch between the chest and the right foreleg back to the junction. Should the leash attached to the junction of the harness be strained, the harness loops then ride up the crotches to engage and apply pressure to the sensitive pits of the forelegs. The dog will then cease to strain against the leash in order to relax the discomfort-producing pressure.

14 Claims, 3 Drawing Sheets

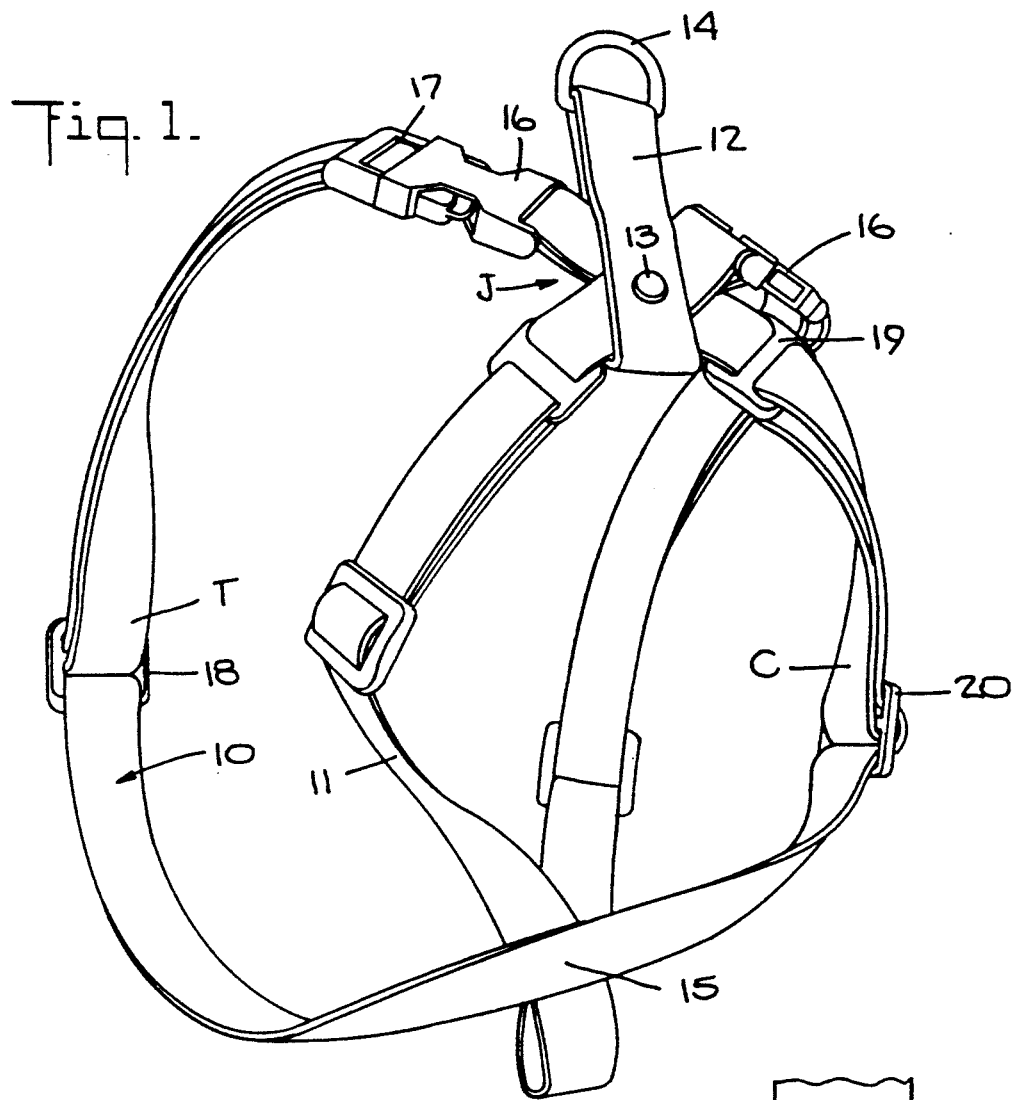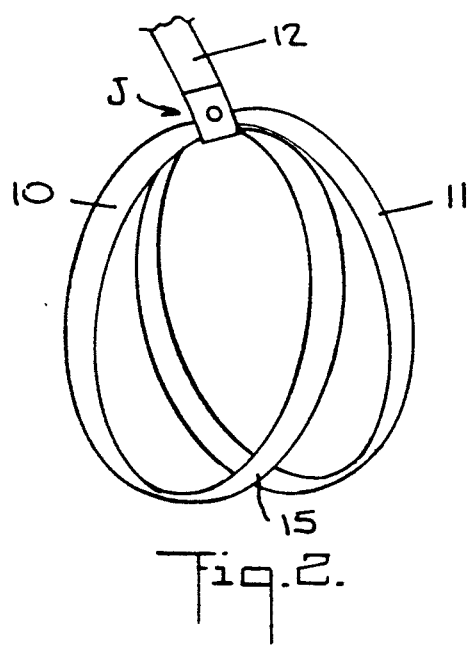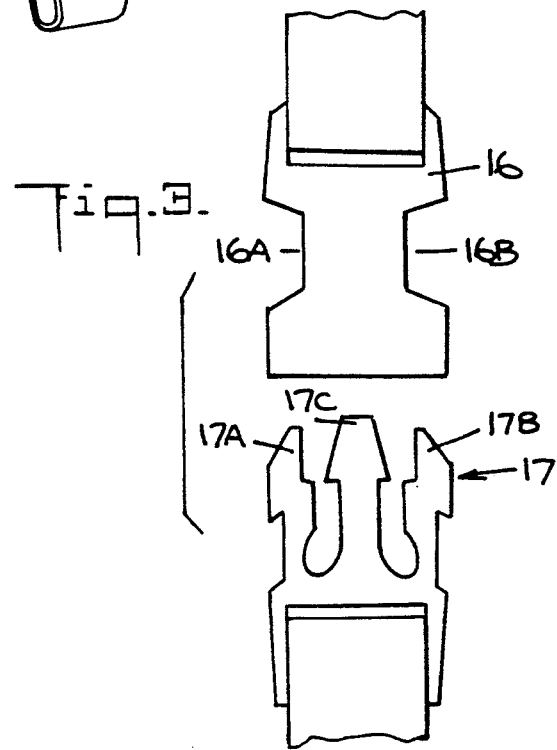

LEASH-CONTROLLABLE DOG HARNESS

BACKGROUND OF INVENTION

1. Field of Invention

This invention relates generally to a dog harness which is connected to a leash held by an individual walking the dog, and more particularly to a leash-controllable dog harness adapted to inhibit the dog from straining against the leash and inducing the dog to come to a halt or to walk at a pace acceptable to the leash holder.

2. Status of Prior Art

A leash is a chain or strap attached to the collar or harness of a dog, the leash being used to lead the dog or to hold it in check.

As pointed out in the Bloom U.S. Pat. No. 2,233,397, when a dog strains against a leash attached to the dog harness, it is important that the harness then avoid a choking effect on the throat of the dog or undue pressure on throat muscles, cords and nerves, for these may have adverse effects on the lungs and heart of the dog.

While Bloom discloses a non-choking harness, this harness does not act to discourage the dog from straining against the leash. Indeed, because the harness is non-choking, there is nothing to inhibit such straining and to hold the dog in check.

The need exists, therefore, for a harness to break older dogs of the habit of straining at the leash and for training younger dogs not to strain at the leash. When a dog strains at the leash, it may, in doing so, wrest the leash from the hands of its master who then loses control of the dog. But this is perhaps a less objectionable aspect of straining, for in the case of a master of advanced years or in relatively weakened condition, should the master hold tightly onto the strained leash to maintain control of the dog, the master may then be pulled to the ground or otherwise upset, with possibly damaging consequences.

To prevent straining at the leash, hobble type dog harnesses are known, such as the hobble harness disclosed in the Patience et al. U.S. Pat. No. 2,670,712, which normally permits free movement of the animal but which restricts the action of the forelegs when the dog attempts to run away or otherwise go out of control.

The Patience et al. harness includes a conventional dog collar and a shoulder strap that has hoops at its opposite ends that loosely fit over the forelegs of the dog. The shoulder strap is adjustable so that the foreleg hoops can be drawn up but not so tightly as to interfere with normal movement of the dog's forelegs. However, if the dog strains on the leash, this strain is also exerted on the shoulder strap, and the foreleg hoops are then drawn upwardly so that movement of the forelegs is restrained and the dog will be brought to a halt.

A harness of the Patience et al. type imposes a physical restraint on the forelegs, and its effectiveness depends on the strength of the dog. Thus with a small dog, this harness may be fully effective, but with a large and more powerful dog, the harness may fail to restrain the dog, particularly if he succeeds in wresting the leash from the hands of his master.

In my prior patent U.S. Pat. No. 4,964,369 (Sporn), there is disclosed a dog harness to which a leash is attachable. When installed on the dog, the harness acts to inhibit the dog from straining against the leash without, however, producing a choking action. The harness comprises a collar that encircles the neck of the dog, and left and right restraint cables whose leading ends are connected to the front section of the collar at left and right positions thereon. The restraint cables go loosely under the left and right foreleg pits of the dog and through respective slip rings attached to the rear section of the collar adjacent its center, the trailing ends of the cables terminating in a coupler to which the leash is attached. When the harnessed dog strains at the leash, this acts to tighten the restraint cables which then impose a pressure on the foreleg pits. Because these pits are highly sensitive, the dog, in order to relieve this pressure, will then cease to strain against the leash and thereby again loosen the restraint cable.

While a harness of the type disclosed in my prior patent is effective for its intended purpose, it requires a collar whose size is appropriate to the neck size of the dog on which it is installed. Also, this harness entails slip rings on the collar through which the restraint cables pass, the cables terminating in a common coupler to which the leash is attached. Since the cables are more or less tightened when the dog strains against the leash, the cables are in time abraded by the ring through which they pass.

SUMMARY OF INVENTION

In view of the foregoing, the main object of this invention is to provide a leash-controllable dog harness which is adapted to apply pressure to the highly sensitive pits of the dog's forelegs and thereby inhibit the dog wearing the harness from taking an action that is not acceptable to the holder of the leash.

Among the significant features of a leash-controllable dog harness in accordance with the invention are the following:

A. The harness includes no neck collar that must be fitted to the neck of the dog being harnessed.

B. The harness does not physically restrain or hobble foreleg movement of the dog.

C. The effectiveness of the harness does not depend on the size of the dog or on its strength or breed, for it is effective on all dogs of all types.

More particularly, an object of the invention is to provide a harness of the above type which includes a pair of loops, one passing through the crotch between the chest of the dog and its fright foreleg, the other through the crotch between the chest and the left foreleg, the loops, when the leash is strained, riding up the crotches to engage and apply pressure to the foreleg pits.

An important advantage of a harness in accordance with the invention is that the size of each loop is easily adjusted so that it is appropriate to the dimensions of the dog wearing the harness, each loop being closed by a releasable buckle so that the harness may readily be installed on the dog or detached therefrom.

Still another object of the invention is to provide a leash-controllable harness whose loops are formed of high-strength, flexible fabric webbing, so that the harness is comfortable to wear and may be mass produced at relatively low cost.

Briefly stated, these objects are attained in a leash-controllable harness adapted to inhibit a dog wearing the harness from straining against the leash held by an individual walking the dog, the harness inducing the dog to come to a halt or to walk at a pace acceptable to the leash holder. The harness is composed of a pair of loops that depend from a leash-coupling junction at which the loops are joined, the loops being angled at the junction with respect to each other so that they cross over at a crossover site below the junction.

When the harness is installed on the dog, the coupling junction to which a leash is connected then overlies the dog's shoulder intermediate the right and left forelegs, and the crossover site lies under the dog's chest, one loop running from the site through the crotch between the chest and the left foreleg and back to the junction, the other loop running from this site through the crotch between the chest and the right foreleg back to the junction. Should the leash attached to the junction of the harness be strained, the harness loops then ride up the crotches to engage and apply pressure to the sensitive pits of the forelegs. The dog will then cease to strain against the leash in order to relax the discomfort-producing pressure.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of a first embodiment of a leash-controllable dog harness in accordance with the invention;

FIG. 2 schematically shows the main components of the dog harness;

FIG. 3 separately shows the male and female elements of a side-release buckle included in the harness:

DESCRIPTION OF INVENTION

The Harness (First Embodiment)

Figure 4:
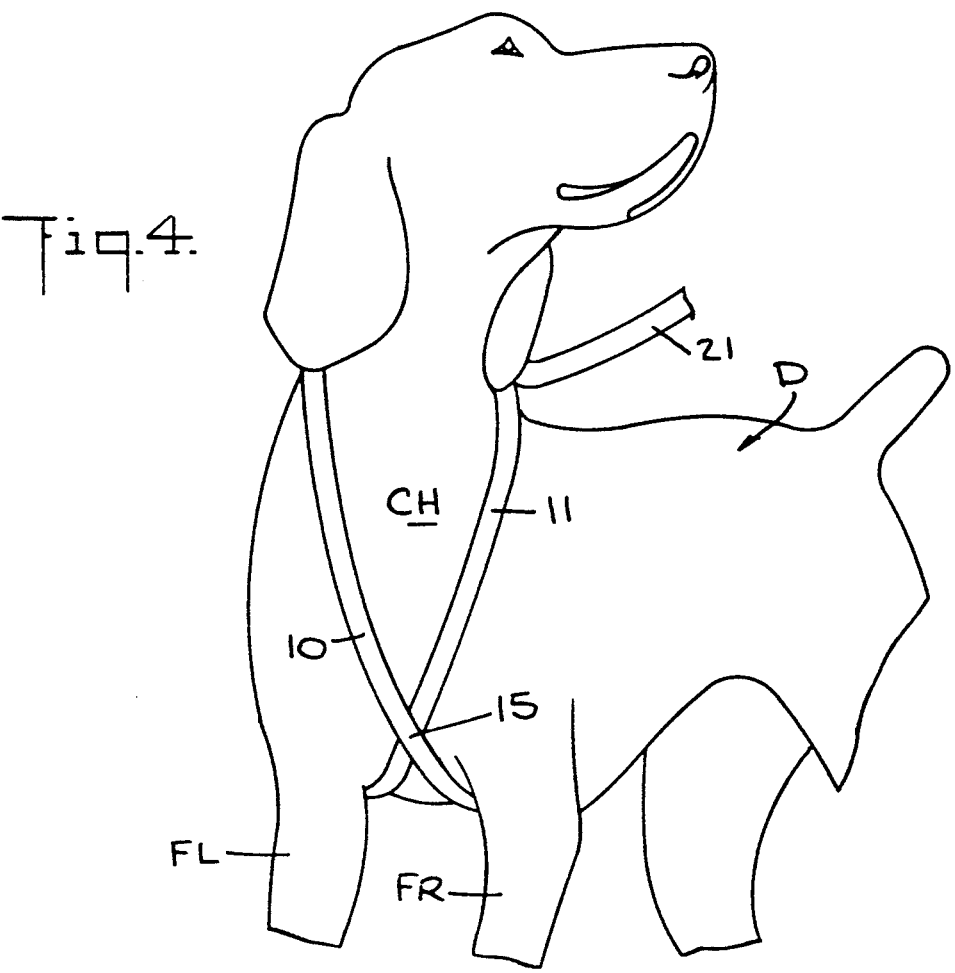
FIG. 4 is a front view of a dog wearing the harness.

Referring now to FIG. 1, there is shown a leash-controllable harness in accordance with the invention, the harness including a pair of like loops of flexible material, generally designated by reference numerals 10 and 11. The loops are preferably made of flexible strap material, such as webbing woven from high strength nylon fibers. Suitable for making the harness is a nylon web of ¾ inch width.

Loops 10 and 11 depend from a leash coupling junction J where they are joined together and to one end of a short strap 12 of the same material by means of a steel rivet 13. Secured to the free end of strap 12 is a steel D-ring 14 to which is attachable the leash for controlling the operation of the harness.

Loops 10 and 11 are angled about 45 degrees with respect to each other at junction J, so that the loops cross each other at a crossover site 15 below junction J. In practice, the loops may be stitched together at this site. Each loop is closed by means of a plastic side release buckle having a female socket 16 joined to junction J and a male plug 17 joined to the free end of the loop.

As shown separately in FIG. 3, male plug 17 is provided with a center tine 17C and a pair of flexible tines 17A and 17B on either side of the center tine. Female socket 16 which receives the male plug is provided with side notches 16A and 16B which expose catch projections on tines 17A and 17B when the male plug is inserted in the socket. To release the buckle, one has only to squeeze in flexible tines 17A and 17B so that the male plug may then be withdrawn from the female socket.

In order to accommodate the harness to a dog of particular size, one must adjust the size of the loops to conform to the torso and chest of the dog. To effect a torso size fit, the length of a folded-over loop section T extending between male plug 17 and a tri-branch slide 18 is adjusted by shifting the position of the slide along the loop. And to effect chest size adjustment, the length of a folded-over loop section C between a tri-branch slide 19 on the loop adjacent junction J and another tri-branch slide 20 is adjusted by shifting these slides to provide the desired lengths of loop section C.

It is to be understood that the invention is not limited to the specific means illustrated for closing the loops and adjusting their size, for other known means, such as those to conform a strap to a waist, may be used for this purpose.

FIG. 2 schematically illustrates the dog harness in its most basic form. The harness is composed of a pair of flexible loops 10 and 11 that are joined together at coupling junction J from which the loops depend, the loops being angled with respect to each other at the junction so that they cross each other at a crossover site 15 below the junction.

It is not essential to the invention that a leash be attached to junction J by means of strap 12 and coupling ring 14. As an alternative to this arrangement, the leash may be formed of the same web material as loops 10 and 11, one end of this leash being directly sewn on or riveted to junction J, the other end of the leash being folded and sewn to form a handle.

Installation of Harness

Figure 5:
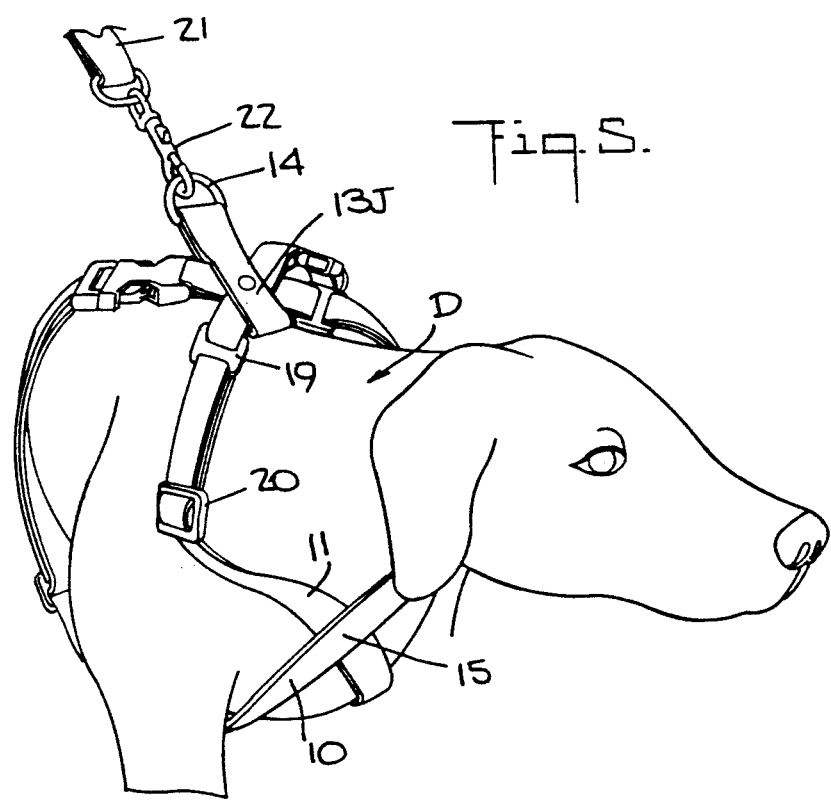
FIG. 5 is a side view of the dog.

As shown in FIGS. 4 and 5, when the harness is installed on a dog D, a leash 21 is then coupled to the harness by means of a metal snap connector 22 joined to the leading end of the leash and engaging coupling ring 14 of the harness.

To install the harness, loops 10 and 11 are unbuckled, and junction J from which the loops depend is placed over the shoulder of the dog midway between the dog's left and right forelegs FL and FR. The unbuckled loop 11 extending from junction J is brought under the dog's chest CH to pass through the crotch between chest CH and left foreleg FL and back to junction J, where it is buckled to close the loop. The unbuckled loop 10, which extends from junction J at an angle to loop 11, is carried over loop 11 and crossover site 15 and passed through the crotch between chest CH and right foreleg FR, and then back to junction J where it is buckled to close this loop so that now the dog is fully harnessed.

The sizes of loops 10 and 11 are adjusted to so that when the harness is installed on dog D, it is somewhat loose thereon and does not bind the dog at any point. When, therefore, the dog is led by an individual holding leash 21 at a pace acceptable to this individual, and the individual does not pull on the leash and the walking dog does not strain against the leash, the harness on the dog remains loose, and the loops passing through the crotches are separated from the sensitive pits of the forelegs.

However, should the dog lurch ahead or seek to increase his pace so that it is faster than that of the individual walking the dog, the resultant strain on the leash will cause loops 10 and 11 to ride up the crotches and to engage and press against the pits of forelegs FL and FR.

As pointed out previously, the foreleg pits of a dog are exceptionally sensitive, and pressure applied thereto gives rise to discomfort to a degreedepending on the degree of pressure. The dog will therefore instinctively seek to relieve the pressure by relaxing his strain on the leash; for in doing so, the loops then ride down the crotch and loosen, so that they no longer engage the pits of the forelegs.

While the harness is adapted to fit dogs in a range of sizes, its effectiveness as a means to control a dog is independent of the size and strength of the dog; for in all cases, the dog will react quickly to pressure applied to the foreleg pits.

The harness, therefore, is a valuable asset in dog training, for it affords the trainer holding the leash with fingertip control of the dog's movement. It only takes a slight tug on the leash to cause the dog to react. Since the harness does not include a collar, when the trainer or master pulls hard on the leash to bring an unruly dog to a halt, this action will not in any way choke the dog and serve only to apply a control pressure on the foreleg pits.

Harness (Second Embodiment)

In the first embodiment of the harness which is illustrated in FIGS. 1 to 5, the pair of flexible loops which depend from junction J to which a leash is attached are joined to this junction at an angle to each other, the junction being placed over the shoulder of the dog.

The arrangement is such that should the leash be pulled by the leash holder or strained by the dog, the loops, whose sizes are pre-adjusted to fit the dog, do not change in size, for the loops are both joined to the junction. However, the loops then ride up the left and right crotches of the dog to engage and apply pressure to the foreleg pits. This action produces discomfort and induces the dog to cease to strain against the leash in order to relax the applied pressure.

Figure 6:
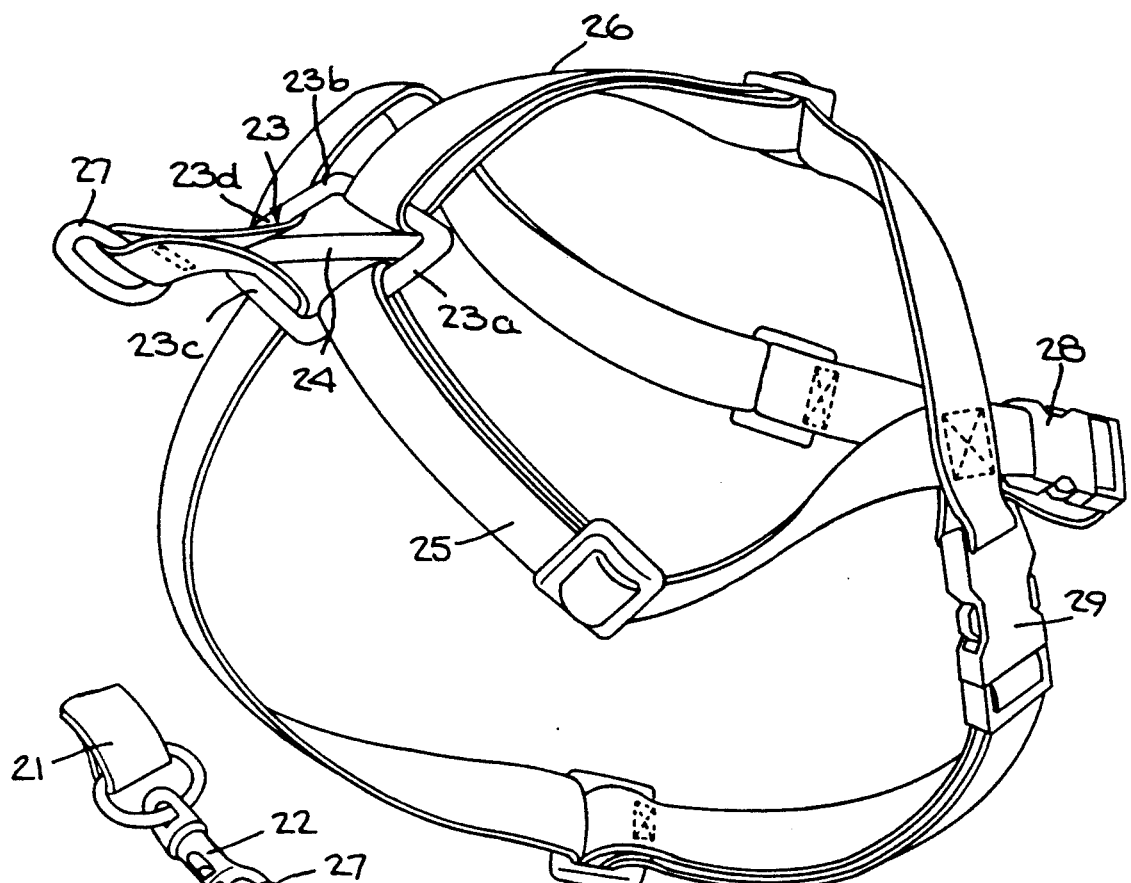
FIG. 6 is a perspective view of a second embodiment of the harness.
Figure 7:
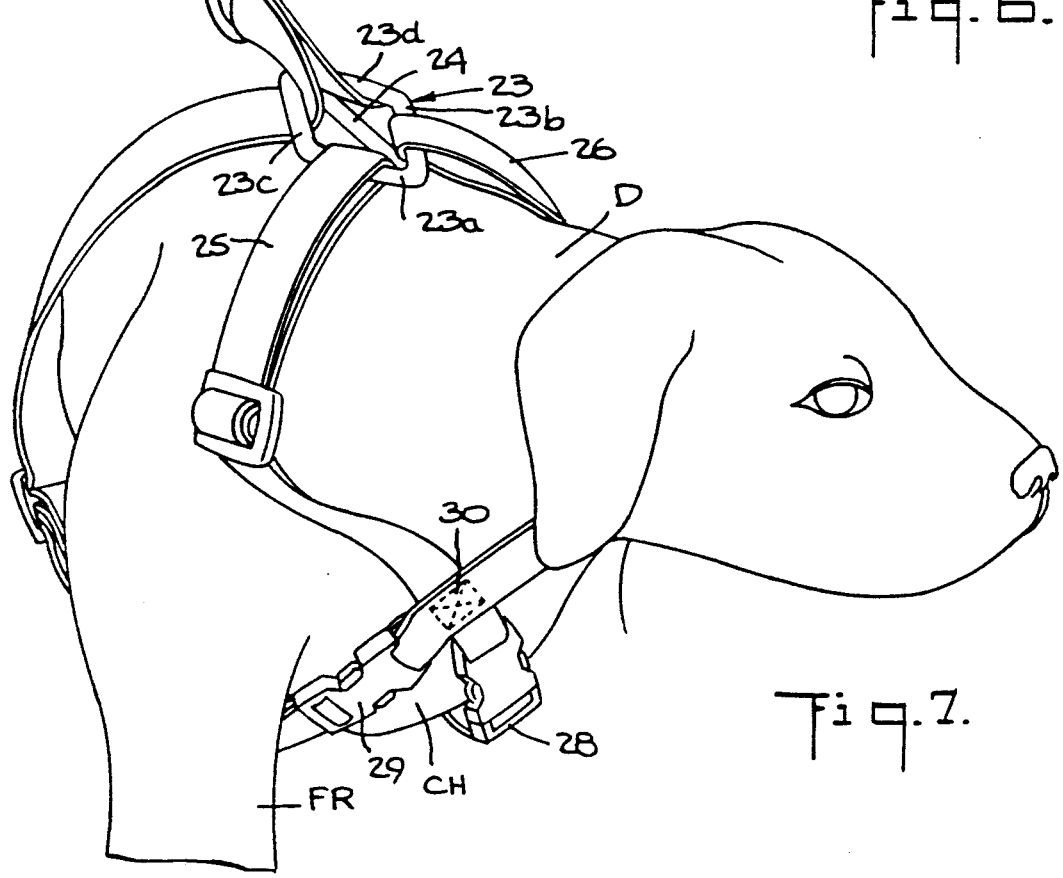
FIG. 7 shows the dog wearing this harness.

In the second embodiment of the invention shown in FIGS. 6 and 7, the junction of the harness which overlies the dog's shoulder takes the form of a diamond-shaped guide slide 23 made of metal whose surface is preferably polished, or other high-strength material. Slide 23 is divided into two triangular open sections by a bar 24 which bridges the upper and lower apexes of the diamond.

A pair of loops 25 and 26 are provided whose sizes are adjustable, as are the loops in the first embodiment. One end of loop 25 is coupled to the lower arm 23a of slide 23, the corresponding end of loop 26 being coupled to the lower arm 23b of the slide, arms 23a and 23b being angled to define a lower apex. The other end of loop 25 passes under the upper arm 23c of slide 23, while the other end of loop 26 passes under the upper arm 23c, these ends extending beyond the slide and terminating in a common harness coupling ring 27. Arms 23c and 23d are angled to define an upper apex.

The metal snap connector 22 of leash 21 is coupled to coupling ring 27; hence, when one pulls the leash, the ends of loops 25 and 26 slide over upper arms 23c and 23d and go out of the slide.

Loop 25 is provided with a plastic side release buckle 28, and loop 26 is provided with a side release buckle 29 so that the loops can be unbuckled from the dog to remove the harness. The loops are stitched together at a crossover site 30, as in the first embodiment.

To install the harness, the guide slide 23 which constitutes the junction of the loops is placed on the dog's shoulder midway between the dog's left and right forelegs, as shown in FIG. 7. Loop 25 is buckled so that it passes through the crotch between chest CH and the left foreleg of the dog. And loop 26 is buckled so that it passes through the crotch between chest CH and the right foreleg, the loops being angled with respect to each other and crossing over at site 30 where they are stitched together, as in the first embodiment.

The sizes of the loops are pre-adjusted so that when installed on the dog, the loops are somewhat loose and do not bind the dog at any point. But however adjusted in size, the loops cannot become disengaged from slide 23, for bar 24 on the slide prevents the ends of the loops coupled to common ring 27 from slipping out of the slide.

It is not essential that bar 24 bridge the upper and lower apexes of the slide, for in practice the bar may extend from the upper apex to join a cross piece (not shown) bridging the side apexes of the diamond, thereby preventing the ends of the loos joined to ring 27 from slipping out.

When, therefore, the harnessed dog is led by an individual holding leash 21 at an acceptable pace and the walking dog does not strain against the leash, the harness remains loose and comfortable, and the loops passing through the crotches are then disengaged from the sensitive pits of the dog's forelegs.

However, should the dog lurch ahead or seek to increase its pace so that it is moving faster than the individual walking the dog, the leash will then be strained. This strain will act to exert a pull on ring 27 which will draw the ends of loops 25 and 26 coupled thereto further out of slide 23, and in doing so reduce the size of the loops passing through the crotches, thereby causing the loops to engage and press against the foreleg pits. The resultant discomfort will induce the dog to relax the strain on the leash so that the loops no longer press against the sensitive pits.

Hence the action of the second embodiment of the harness is similar to that disclosed in my prior patent U.S. Pat. No. 4,964,369, in which when the leash is strained, this acts to tighten the restraint cables to cause them to press against the foreleg pits. However, the harness in this patent requires for its operation a collar that encircles the neck of the dog and is fitted to the size of the neck, whereas the second embodiment of the harness entails no collar and is free of the problems associated with a dog collar.

Both the first and second embodiments of the harness include the significant features of the invention, for both harnesses include no neck collar, they do not physically restrain or hobble foreleg movement, and their effectiveness does not depend on the size, strength or breed of the dog harnessed, for the harness is effective on all dogs.

While there have been shown and described preferred embodiments of a leash-controllable dog harness in accordance with the invention it will be appreciated that many changes and modifications may be made therein without, however, departing from the essential spirit thereof.

I claim:

1. A leash-controllable harness for a dog having a shoulder, a chest, left and right forelegs, a left foreleg crotch and a right foreleg crotch, each crotch leasing to a sensitive foreleg pit, said harness comprising:

(a) a junction to which a leash is attachable, said junction when the harness is installed on the dog lying over its shoulder; and (b) a pair of flexible loops depending from the junction and joined thereto at an angle to each other, the loops when the harness is installed crossing over at a crossover site against the chest of the dog at a position well above the forelegs, one loop running at an angle from the crossover site through the left crotch and back to the junction, the other loop running at an opposing angle from the crossover site through the right crotch back to the junction, whereby should the leash be pulled by a leash holder or strained against by the dog, the loops then ride up the left and right crotches to engage and apply pressure to the foreleg pits, thereby inducing the dog to take an action relaxing the pressure, the junction being formed by a slide having an opening, and each loop is formed by a strap, one end of the strap being attached to the slide, and the other end of the strap slidably passing through said opening in said slide and being coupled to a leash.

2. A harness as set forth in claim 1, in which the loops are formed by fabric webbing material.

3. A harness as set forth in claim 2, in which the webbing is woven of nylon fibers.

4. A harness as set forth in claim 3, in which the webbing has a width of about three quarters of an inch.

5. A harness as set forth in claim 2, in which attached to the junction is a short strap terminating in a ring to which a leash is attachable.

6. A harness as set forth in claim 1, in which the size of the loops is adjustable relative to the dimensions of the dog, so that the harness is normally loose on the dog and the loops are normally separated from the foreleg pits.

7. A harness as set forth in claim 1, in which each loop is joined at one end to the junction by a releasable buckle, so that when installing the harness each unbuckled loop, after being passed through the related crotch, may then be buckled to the junction to close the loop.

8. A harness as set forth in claim 7, in which the buckle is a side release buckle having a female socket coupled to the junction, and a male plug attached to an end of the loop and insertable in the socket.

9. A harness as set forth in claim 7, in which the loop includes means to shorten or lengthen it so that the loop size can be adjusted to conform to the dimensions of the do on which the harness is installers.

10. A harness as set forth in claim 9, in which means to adjust the length of the loop includes a slide shiftable in the loop.

11. A harness as set forth in claim 1, in which the slide is a diamond shaped ring formed by a pair of angled lower arms having an apex, and a pair of angled upper arms having an apex, the one end of each loop being coupled to a respective lower arm, and the other end of each loop passing through the ring and sliding under a respective upper arm to extend beyond the slide.

12. A harness as set forth in claim 11, wherein said diamond is divided into two open triangular sections by a bar bridging the upper and lower apexes.

13. A harness as set forth in claim 12, in which the ends of the loops which extend beyond the slide are connected to a common ring to which the leash is coupled.

14. A harness controllable by a leash for use on a dog having a shoulder, a left foreleg crotch and a right foreleg crotch, each crotch leading to a respective sensitive pit; said harness comprising:

(a) a junction provided with a left and a right opening to slidably receive a strap; said junction when the harness is in use, lying over the shoulder of the dog; and (b) a pair of flexible loops, each defined by a strap, one end of which is coupled to said junction, the other end going through a respective opening, whereby when the harness is installed the strap of one loop passes through the left crotch and from there through the left opening to be coupled to said leash; the strap of the other loop passes through the right crotch and from there through the right crotch and from there through the right opening to be coupled to said leash whereby should the leash be pulled by a leash holder or strained against by the dog, the loops then ride up the left and right crotches to engage and apply pressure to a sensitive pit to induce the dog to take an action relaxing the pressure.

* * * * *